April 20, 1937.    M. E. WEISS    2,077,501
ICE CREAM DIPPER
Filed June 22, 1936
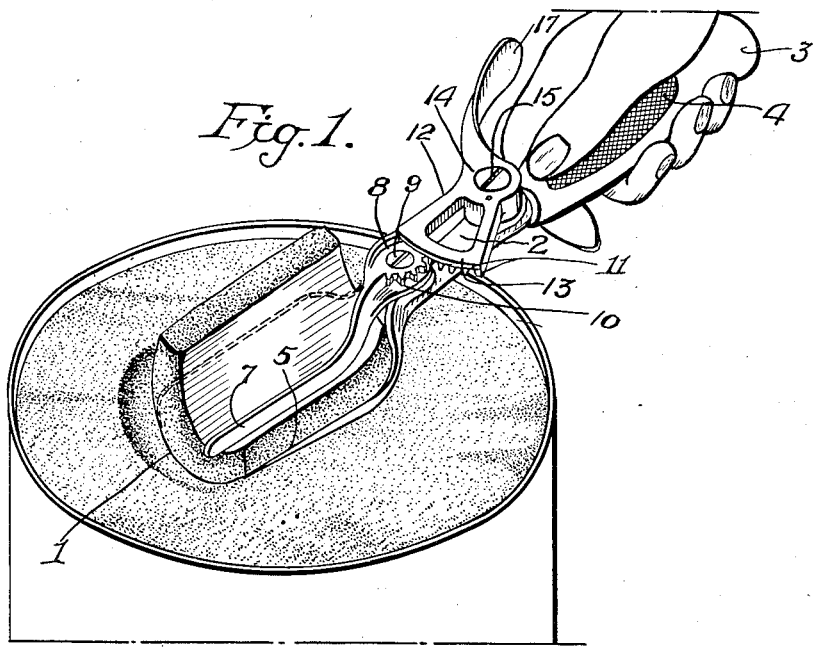
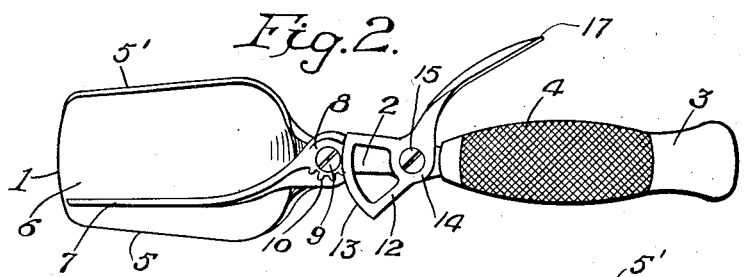
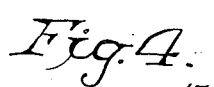
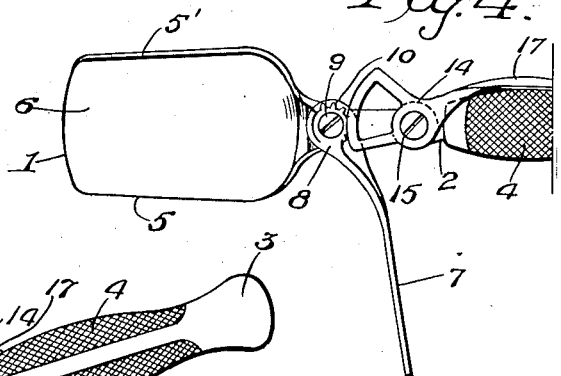
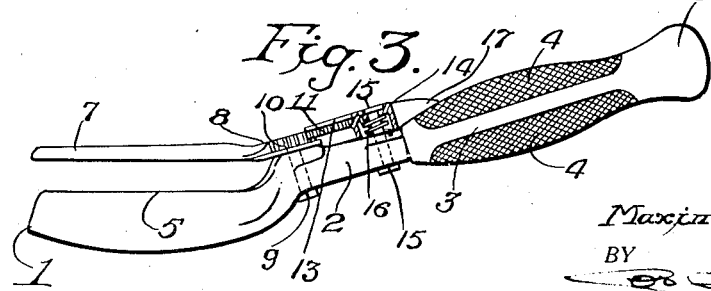
INVENTOR.
Maximilian E. Weiss
BY
ATTORNEY.

Patented Apr. 20, 1937

2,077,501

UNITED STATES PATENT OFFICE 2,077,501

ICE CREAM DIPPER

Maximilian Edward Weiss, Philadelphia, Pa.

Application June 22, 1936, Serial No. 86,540

6 Claims. (Cl. 107—48)

My invention is an improved utensil designed for slicing or scraping a relatively thin layer or sliver from a body of frozen comestible, such as ice cream, water ice, or the like into the bowl of a dipper and for facilitating the discharge of the severed slice or sliver from the bowl of the dipper, the sliver being bent or curled by the curvature of the bowl. A leading object of my invention is the avoidance of the expulsion of the air or gas occluded in the ice cream during the manufacture thereof. The loss of such air or gas by digging into the body of ice cream in the ordinary manner not only decreases the volume thereof, with resultant loss to the dispenser by shrinkage, but also impairs the texture and palatability of the ice cream.

By my improvements, ice cream which has been hardened in bulk in large containers may be vended therefrom in saleable portions having an aggregate volume or bulk substantially equal to the rated capacity of the container, thereby largely avoiding the shrinkage commonly suffered by retail vendors of ice cream packed in bulk; it being common experience of such vendors that the merchandise dispensed by dippers from a container in the usual manner amounts to less than seventy-five percent of the actual content of the bulk container.

My invention comprises a dipper including a handle and a concave bowl preferably provided with a slicing edge along one side thereof, the bowl having curved sections acting as a mold board for bending or curling a slice during severance by the slicing edge. The thickness of the slice severed is regulated, and excessive penetration of the bowl into the body of ice cream is prevented, by a movable guard formed by a journalled rod extending along the side of the bowl adjacent to its slicing edge but normally spaced therefrom, and which may be readily retracted from the slicing edge to permit the discharge of the severed slice from the bowl.

The characteristic features and advantages of my improvements will further appear from the following description and the accompanying drawing illustrating a preferred embodiment of my invention.

In the drawing, Fig. 1 is a perspective view illustrating the structure and utilization of a utensil embodying my invention; Fig. 2 is a top plan view of my improved utensil; Fig. 3 is a side elevation of the utensil shown in Fig. 2; and Fig. 4 is a top plan view similar to Fig. 2 but with the guard retracted.

In the embodiment of my invention illustrated in the drawing, a concave bowl 1, of gerenally rectangular outline, has a shank 2 and a stem 3 to which are fixed heat insulating grip members 4 to form a handle. The bowl is sharpened along one side to provide a slicing edge 5, and the intermediate section 6 and opposite edge 5' are preferably so curved as to bend or curl a slice of ice cream under which the bowl is moving.

A guard 7 has a hub 8 journalled on the stem of a headed pivot 9 threaded into the shank 2. The guard 7 preferably consists of a curved rod of substantially triangular cross section with its flat bottom surface disposed a slight distance above and inward from the cutting edge 5, and in such position obstructs but little of the top of the bowl. The hub 8 is provided with pinion teeth 10 concentric with its axis of rotation and meshing with rack teeth 11 on a quadrant 12, which has a lip 13 overlying the meshing teeth. The quadrant has a hub 14 which is journalled on a pivot 15 threaded into the shank, and the hub is normally biased by a coiled spring 16, having one end anchored in the shank and the other end anchored in the hub to hold the parts in the position illustrated in Figs. 1, 2 and 3.

A curved lever 17 on the hub 14 projects outwardly therefrom and is spaced from the handle and partly overlaps a hand grasping the handle when the utensil is being used to cut a slice of ice cream from a body thereof. By moving the lever 17 as shown in Fig. 4 toward the handle, against the biasing action of the spring 16, the rack teeth 11 rotate the hub 8 and move the guard 7 outward away from the cutting edge 5 and from the slice of ice cream in the bowl.

It will be understood that in the operation of the device, the cutting edge 5 of the bowl is dipped into the body of ice cream until its downward movement is checked by the guard 7, and the utensil is then translated across the body of ice cream so as to sever therefrom a slice having substantially the thickness of the distance between the edge 5 and the bottom of the guard 7. When a slice of sufficient length has been cut and curled by the molding action of the concavity 6 and edge 5', the utensil is lifted from the body of ice cream and inverted, and the guard 7 rocked away from the cut slice by pressing the finger piece of the lever 17.

Having described my invention, I claim:

1. A utensil of the character described comprising a handle, a bowl provided with a slicing edge, and a movable guard normally positioned adjacent to but spaced above said edge to regulate the thickness of a slice cut by said edge.

2. A utensil of the character described comprising a handle, a bowl having a slicing edge, and a journalled rod normally positioned adjacent to but spaced from said edge for regulating the thickness of a slice cut thereby.

3. A utensil of the character described comprising a handle, a bowl having a slicing edge, a journalled rod forming a guard normally spaced above and inward from said edge to regulate the thickness of a slice cut thereby, means for biasing said guard toward its aforesaid position, and means for rocking said guard away from said edge to permit the free discharge from the bowl of a slice cut by said edge.

4. A utensil of the character described comprising a handle, a bowl having a slicing edge, a shank connecting said handle and bowl, a rod forming a guard adjacent to but spaced from said slicing edge, said guard having a hub pivotally connected with said shank, a lever pivotally connected with said shank and movable toward and from said handle, and means comprising meshing teeth connecting said lever and hub to effect the movement of said guard away from said slicing edge.

5. A utensil of the character described comprising a handle, a shank connected with said handle, a bowl connected with said shank and having a slicing edge on one side and a curvature forming a mould board tending to bend a slice cut by said edge, a rod forming a guard adjacent to but spaced from said edge to regulate the thickness of a slice cut thereby, said guard having a toothed hub pivotally connected with said shank, and means forming a rack for rocking said toothed hub and having a finger piece adjacent to said handle.

6. A utensil of the character described comprising a handle, a shank connected with said handle, a bowl connected with said shank and having a slicing edge on one side and a curvature forming a mould board tending to bend a slice cut by said edge, a rod forming a guard normally adjacent to but spaced from said edge to regulate the thickness of a slice cut thereby, said rod having a toothed hub pivotally connected with said shank, a lever pivotally connected with said shank and having a toothed segment meshing with the teeth of said hub, one of said toothed members having a lip overlapping the meshing teeth, and a spring for normally biasing said parts to position said guard rod in its aforesaid position, said guard rod being rocked by the rocking of said lever against the biasing action of said spring.

MAXIMILIAN EDWARD WEISS.